(12) United States Patent
Lou

(10) Patent No.: US 8,406,717 B1
(45) Date of Patent: Mar. 26, 2013

(54) DIGITAL FM STEREO RECEIVER ARCHITECTURE TO RECOVER CARRIER INFORMATION BASED ON STEREO OR MONO SIGNALS

(75) Inventor: Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 920 days.

(21) Appl. No.: 12/170,224

(22) Filed: Jul. 9, 2008

Related U.S. Application Data

(63) Continuation of application No. 10/819,649, filed on Apr. 6, 2004, now Pat. No. 7,406,302.

(60) Provisional application No. 60/531,302, filed on Dec. 18, 2003, provisional application No. 60/529,656, filed on Dec. 15, 2003.

(51) Int. Cl.
H04H 40/45 (2008.01)
H04B 1/16 (2006.01)

(52) U.S. Cl. ............... 455/214; 455/205; 381/2; 381/3

(58) Field of Classification Search .......... 455/205, 455/211, 213, 214, 334, 42, 208, 216, 229, 455/258, 260, 263; 381/2, 3, 12, 22
See application file for complete search history.

(56) References Cited

U.S. PATENT DOCUMENTS

| | | | |
|---|---|---|---|
| 4,550,423 A | 10/1985 | Naito | |
| 4,680,793 A | 7/1987 | Sugai et al. | |
| 4,817,151 A | 3/1989 | Bod et al. | |
| 4,860,354 A | 8/1989 | Van Roermund | |
| 5,357,574 A * | 10/1994 | Whitecar | 381/4 |
| 5,404,405 A | 4/1995 | Collier et al. | |
| 5,561,849 A | 10/1996 | Mankovitz | |
| 5,920,632 A | 7/1999 | Lubbe et al. | |
| 6,694,026 B1 * | 2/2004 | Green | 381/3 |
| 6,714,651 B2 | 3/2004 | Yamamoto | |
| 7,079,657 B2 | 7/2006 | Wu et al. | |
| 7,181,018 B1 | 2/2007 | Green | |
| 2003/0087618 A1 | 5/2003 | Li et al. | |
| 2004/0101143 A1 | 5/2004 | Avalos et al. | |
| 2006/0078128 A1 * | 4/2006 | Meeusen | 381/2 |

OTHER PUBLICATIONS

Recommendation ITU-R BS. 450-3, "Transmission Standards for FM Sound Broadcasting at VHF", (1982-1995-2001), The ITU Radiocommunication Assembly.

Faller et al., "Technical Advances in Digital Audio Radio Broadcasting", Proceedings of the IEEE, vol. 90, No. 8, Aug. 2002, pp. 1303-1333.

* cited by examiner

*Primary Examiner* — Blane J Jackson

(57) ABSTRACT

Systems and techniques for digital processing of FM stereo signals are described. In some implementations, a receiver system is provided. The receiver system can include a received signal input configured to receive a digital signal based on a received mono signal or a received stereo signal. The receiver system can also include a stereo detector coupled with the received signal input, the stereo detector configured to produce a stereo detection signal indicating either a received stereo signal or a received mono signal. The receiver system can further include a digital signal processor coupled with the stereo detector, the digital signal processor configured to process the digital signal based on stereo transmission when the stereo detection signal indicates a received stereo signal and process the digital signal based on mono transmission when the stereo detection signal indicates a received mono signal.

14 Claims, 4 Drawing Sheets

DIGITAL FM STEREO RECEIVER ARCHITECTURE TO RECOVER CARRIER INFORMATION BASED ON STEREO OR MONO SIGNALS

CROSS REFERENCE TO RELATED APPLICATIONS

This application is a continuation of U.S. patent application Ser. No. 10/819,649, filed Apr. 6, 2004, and issued Jul. 29, 2008 as U.S. Pat. No. 7,406,302, which claims priority to U.S. Provisional Application Ser. No. 60/531,302, filed Dec. 18, 2003 and U.S. Provisional Application Ser. No. 60/529,656, filed Dec. 15, 2003, each of which is incorporated herein by reference in its entirety.

TECHNICAL FIELD

This disclosure relates to digital techniques for FM stereo reception.

BACKGROUND

Public broadcast of radio is an important source of information and entertainment for people all over the world. The transmission of radio programs is based on analog technology, typically using amplitude modulation (AM), frequency modulation (FM), and stereophonic FM (also referred to as FM stereo). In an analog FM system, an analog signal may be encoded into a carrier wave by variation of its instantaneous frequency in accordance with the input analog signal.

FM stereo was introduced to create a more natural listening experience. Rather than a single signal including all of the audio information, stereo transmission involves separate left (L) and right (R) signals. The received and processed L and R signals are sent to different speakers, reproducing (at least partially) the spatial location of the source of a sound.

There are two systems for transmission of FM stereo defined by the International Telecommunications Union (ITU): the stereophonic multiplex signal system and the pilot tone system. In the pilot tone system (according to the ITU standard), suppressed-carrier amplitude modulation is used to modulate stereophonic information onto a higher frequency, and that information can be combined with mono-compatible information in the baseband to form a composite signal that is then frequency modulated to the appropriate program channel. To detect the stereo signal, the carrier that modulates the stereophonic information needs to be recovered.

SUMMARY

Systems and techniques described herein provide for digital processing of FM mono and stereo signals.

Systems and techniques for digital processing of FM stereo signals are described. In general, in one aspect, a receiver system may include an input to receive a signal such as a stereo signal or a mono signal. A stereo detector may produce an output based on whether the received signal is a stereo signal or a mono signal.

A carrier recovery module may recover a carrier signal based on the received signal. The system may include a multiplexer and a digital signal processor in communication with the multiplexer. The output of the multiplexer may be based on whether the received signal is a stereo signal or a mono signal. In some implementations, the multiplexer may be omitted. In some implementations, the system may include multiple digital signal processors; for example, the system may include a digital signal processor to process a left plus right signal and another digital signal processor to process a difference signal.

The digital signal processor may include a filter, which may include at least one of a low pass filter and a notch filter. The digital signal processor may further include a sub-sampling module. The digital signal processor may further include a de-emphasis module.

The system may further include a left/right processor to generate separate left and right signals. The separate left and right signals may be separate left and right bitstreams based on an output signal from a digital signal processor.

In general, in another aspect, a receiver system includes an input means for receiving a digital signal based on a mono signal or a stereo signal. The system may include stereo detection means for producing a stereo detection output. The system may include carrier recovery means for recovering a carrier signal based on the digital signal. The system may include multiplexing means for producing an output based on receiving a mono signal or a stereo signal. The signal may include a digital signal processor.

In general, in another aspect, a method may include determining whether a received FM signal is based on mono transmission or stereo transmission. Determining whether the received FM signal is based on mono transmission or stereo transmission may include filtering the received FM signal, and may further include comparing a parameter based on an amplitude of the filtered signal with a reference amount.

If the received FM signal is based on stereo transmission, the method may further include recovering a carrier signal based on the received FM signal. The method may include generating a digital signal indicative of a difference between left and right signals based on the received FM signal using the carrier signal.

The method may further include generating a digital left plus right signal based on the received FM signal, and processing the digital difference signal and the digital left plus right signal. The method may further include generating a digital left signal and a digital right signal. Processing the difference signal and the left plus right signal may include at least one of filtering the signal, sub-sampling the signal, and de-emphasizing the signal.

In general, in another aspect, a computer program is operable to cause one or more machines to perform operations including determining whether the received FM signal is based on mono or stereo transmission. Determining whether the received FM signal is based on mono transmission or stereo transmission may include filtering the received FM signal, and may further include comparing a parameter based on an amplitude of the filtered signal with a reference amount.

If the received FM signal is based on stereo transmission, the operations may further include recovering a carrier signal based on the received FM signal. The operations may include generating a digital signal indicative of a difference between left and right signals based on the received FM signal using the carrier signal.

The operations may further include generating a digital left plus right signal based on the received FM signal, and processing the digital difference signal and the digital left plus right signal. The operations may further include generating a digital left signal and a digital right signal. Processing the difference signal and the left plus right signal may include at least one of filtering the signal, sub-sampling the signal, and de-emphasizing the signal.

In general, in another aspect, a receiver system includes an input to receive a digital signal. The system includes a carrier recovery module configured to recover a carrier signal, and a digital signal processor configured to filter the digital signal. The digital signal processor may be further configured to sub-sample the digital signal. The digital signal processor may be further configured to de-emphasize the digital signal.

In general, in another aspect, a receiver system includes an input means to receive a digital signal. The system includes a carrier recovery means for recovering a carrier signal, and a digital signal processing means for filtering the digital signal. The digital signal processing means may be further be for sub-sampling the digital signal. The digital signal processing means may be further for de-emphasizing the digital signal.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
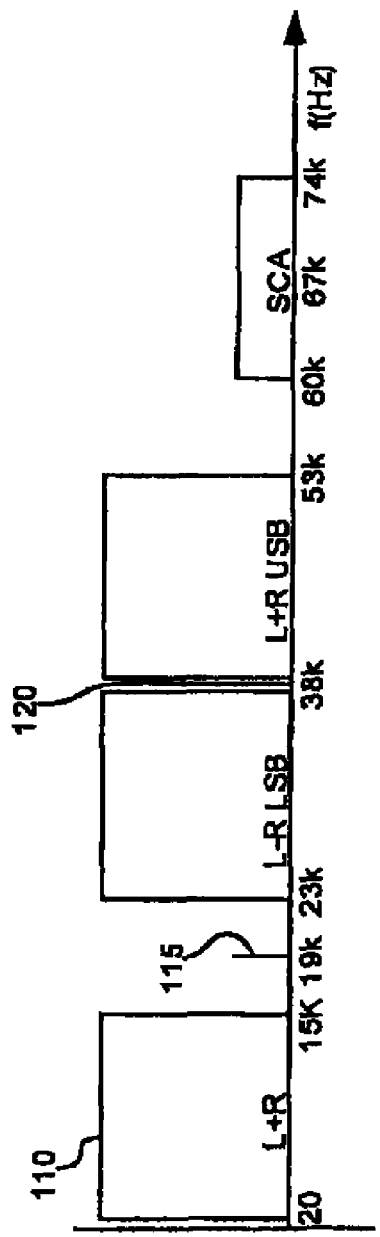
FIG. 1 is a conceptual FM stereo transmission spectrum.

As noted above, a pilot tone FM stereo system uses frequency modulation for a frequency division multiplexed baseband signal having a stereophonic signal and a pilot tone. FIG. 1 shows a conceptual spectrum for FM stereo transmission. According to the ITU specification, a pilot tone system multiplexes the left and right audio signal channels to create a mono-compatible signal that is equal to the sum of the left and right channels (L+R). The mono-compatible signal is transmitted in the baseband 110.

The difference of the left and right channels (referred to as L−R herein; however the R−L may be used) is modulated using suppressed-carrier amplitude modulation with a carrier frequency 120 of 38 kHz. A 19 kHz reference signal, which is referred to as a pilot tone 115, is transmitted as well. Although not discussed herein, there are optional auxiliary data transmission channels such as the Subsidiary Communications Authorization (SCA) channel that are generally transmitted at lower power and higher frequencies (e.g., beyond 53 kHz).

Note also that although the currently used pilot tone and carrier frequencies (19 kHz and 38 kHz, respectively) are discussed herein, the current systems and techniques may be applied for frequencies different than those in current use.

Both the sum and difference signals may be pre-emphasized according to the ITU specification. The L+R, L−R, and the pilot signals form a multiplexed signal that is then frequency modulated to the desired carrier frequency and transmitted. At the receiver, the 38 kHz carrier needs to be recovered using 19 kHz pilot reference signal in order to detect the difference signal.

Figure 2:
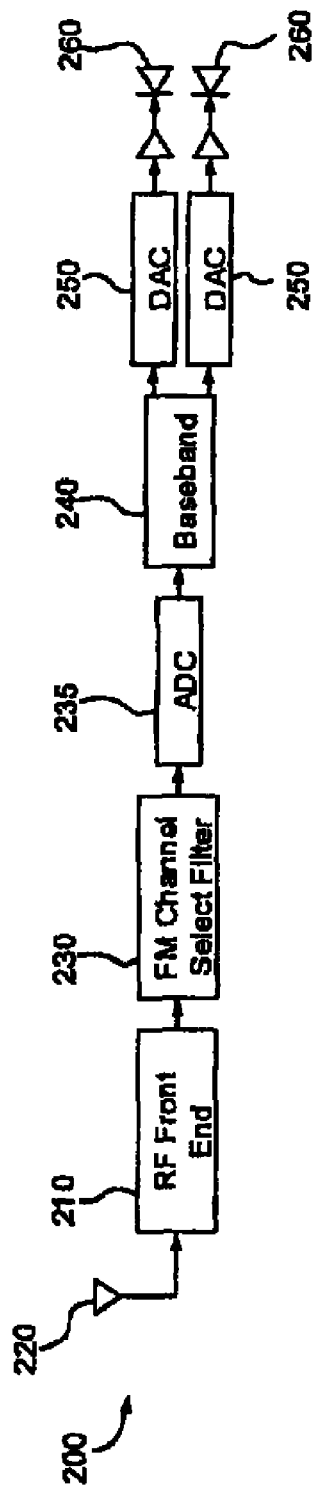
FIG. 2 is a functional block diagram of a digital implementation of an FM stereo receiver.

FIG. 2 shows a functional block diagram of a digital implementation of an FM receiver 200. A radio frequency (RF) analog front-end 210 receives an FM signal from an antenna 220 and transmits an analog signal to an FM channel select filter 230, which filters out the desired program channel. An analog-to-digital converter (ADC) 235 converts the resulting analog signal to a digital signal. Note that the received analog signal may be converted to a digital signal prior to selecting the desired channel, in some implementations.

The digital signal is demodulated using a digital baseband processor 240, described in more detail below. One or more digital to analog converters (DACs) 250 may then be used to transform the left and right channel bitstreams to the analog domain so that they may be played (e.g., the left and right analog signals may be used to drive speakers 260).

Figure 3:
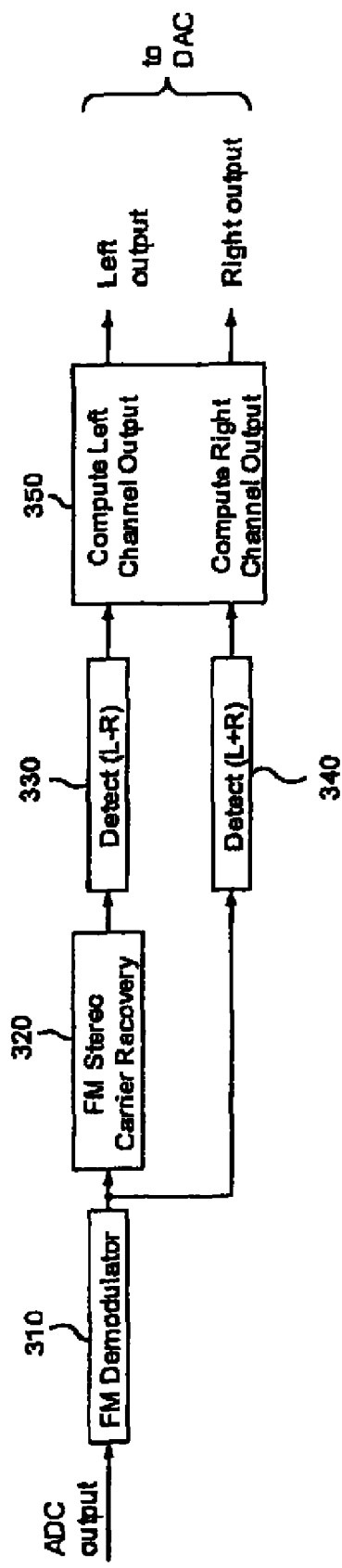
FIG. 3 is a functional block diagram of an implementation of a digital FM stereo baseband processor.

A functional block diagram of an implementation of a digital FM stereo baseband processor such as processor 240 is shown in FIG. 3. An FM demodulator 310 may receive the output bitstream of an ADC such as ADC 235 of FIG. 2. Demodulator 310 extracts the multiplexed L+R, L−R, and the reference pilot tone.

The 38 kHz carrier may be recovered using a carrier recovery module 320. Carrier recovery module 320 uses the pilot tone to recover the 38 kHz carrier in order to detect the L−R bitstream. A detector 330 may implement (for example) bandpass and/or low pass filtering to detect the L−R bitstream.

A detector 340 may implement (for example) low pass filtering to extract the L+R bitstream. Finally, the L+R and L−R bitstreams can be combined appropriately using a combiner 350 to obtain the bitstreams corresponding to the left and right channels. The output of combiner 350 may be provided to one or more DACs, such as DAC 250 of FIG. 2.

Figure 4:
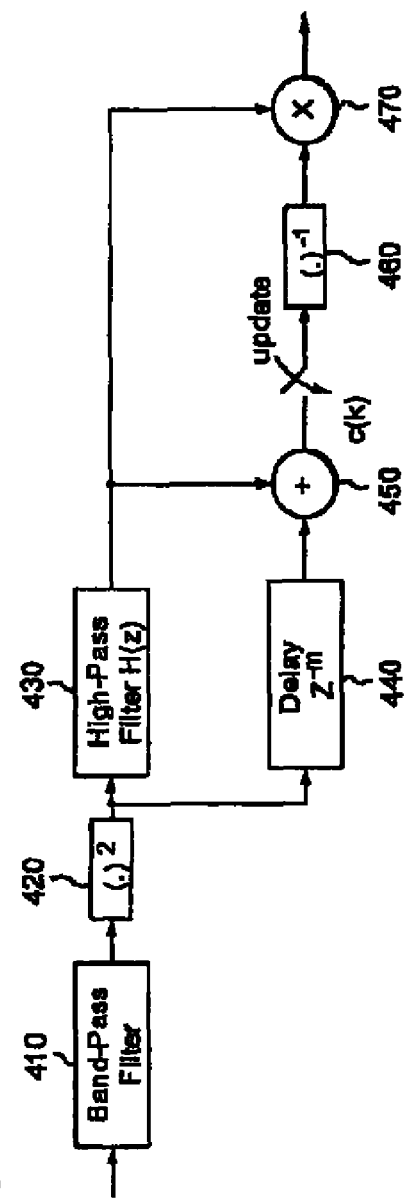
FIG. 4 shows a functional block diagram of an implementation of a carrier recovery module.

FIG. 4 shows an implementation of a carrier recovery module such as carrier recovery module 320 of FIG. 3. A bandpass filter 410 may be used to obtain the 19 kHz pilot tone. A multiplier such as a squaring module 420 may be applied to the filtered signal. The output of squaring module 420 includes both a component at 38 kHz (twice the input signal frequency) and a DC component, as Equation (1) illustrates:

$$\cos^2\alpha = \frac{1}{2}(1 + \cos 2\alpha) \qquad \text{Equation (1)}$$

A high pass filter 430 may be used to filter out the carrier signal at 38 kHz. Many possible implementations of high pass filters H(Z) may be used to recover the carrier signal.

Squaring (or other multiplication of) the input signal allows for the recovery of a signal at 38 kHz based on the 19 kHz pilot tone. However, magnitude of the L+R and L−R bitstreams may also need to be normalized by determining a scaling factor for the squared input signal. The bitstreams may need to be normalized because, e.g., the transmitter generally scales the magnitude of the pilot tone to a lower power level than the transmitted audio signal.

Furthermore, transmission channel effects (such as a Doppler effect resulting from a moving transmitter and/or receiver) and the transceiver hardware implementation may cause the scaling factor (which may be denoted as a(t)) to change with time. Squaring the pilot tone with a scaling factor can be represented as shown in Equation (2):

$$a^2(t)\cos^2(2\pi f_p t) = \frac{a^2(t)}{2}(1 + \cos 2\pi(2f_p)t) \qquad \text{Equation (2)}$$

where $f_p=19$ kHz. To estimate the sampled scaling factor $$\frac{a^2(t)}{2},$$

denoted as c(k) in FIG. 4, a low-complexity low-pass filter can be implemented using the combination of the high pass filter 430 (denoted as H(Z) in FIG. 4) and a delay element 440 (denoted as $Z^{-m}$ in FIG. 4, where m=n/2 and n is the order of the filter H(Z)).

The output of filter 430 may be subtracted from the output of delay element 440 using a summer 450. The output of summer 450 is c(k), which may then be inverted using an inverter 460. The output of filter 430 can then be multiplied by 1/c(k) to obtain the recovered and normalized 38 kHz carrier, using a multiplier 470.

As noted above, a(t) (or alternatively c(k)) may vary over time. Accordingly, in some implementations, the scaling factor may be determined a single time, while in others it is updated at least once, updated periodically, or updated generally continuously. For example, if a(t) is changing slowly over time, the computation of c(k) may be done occasionally or periodically. However, if a(t) is changing appreciably, it may be advantageous to update a(t) continuously.

Other implementations of a carrier recovery module may be used. For example, depending on the overall FM stereo receiver architecture design, the correction factor may be passed onto the part of a baseband processor where the magnitude of the L+R and L−R bitstreams are normalized. In an example of such an implementation, the L+R bitstream may be multiplied by c(k) in order to avoid the division operations required to compute 1/c(k).

Figure 5:
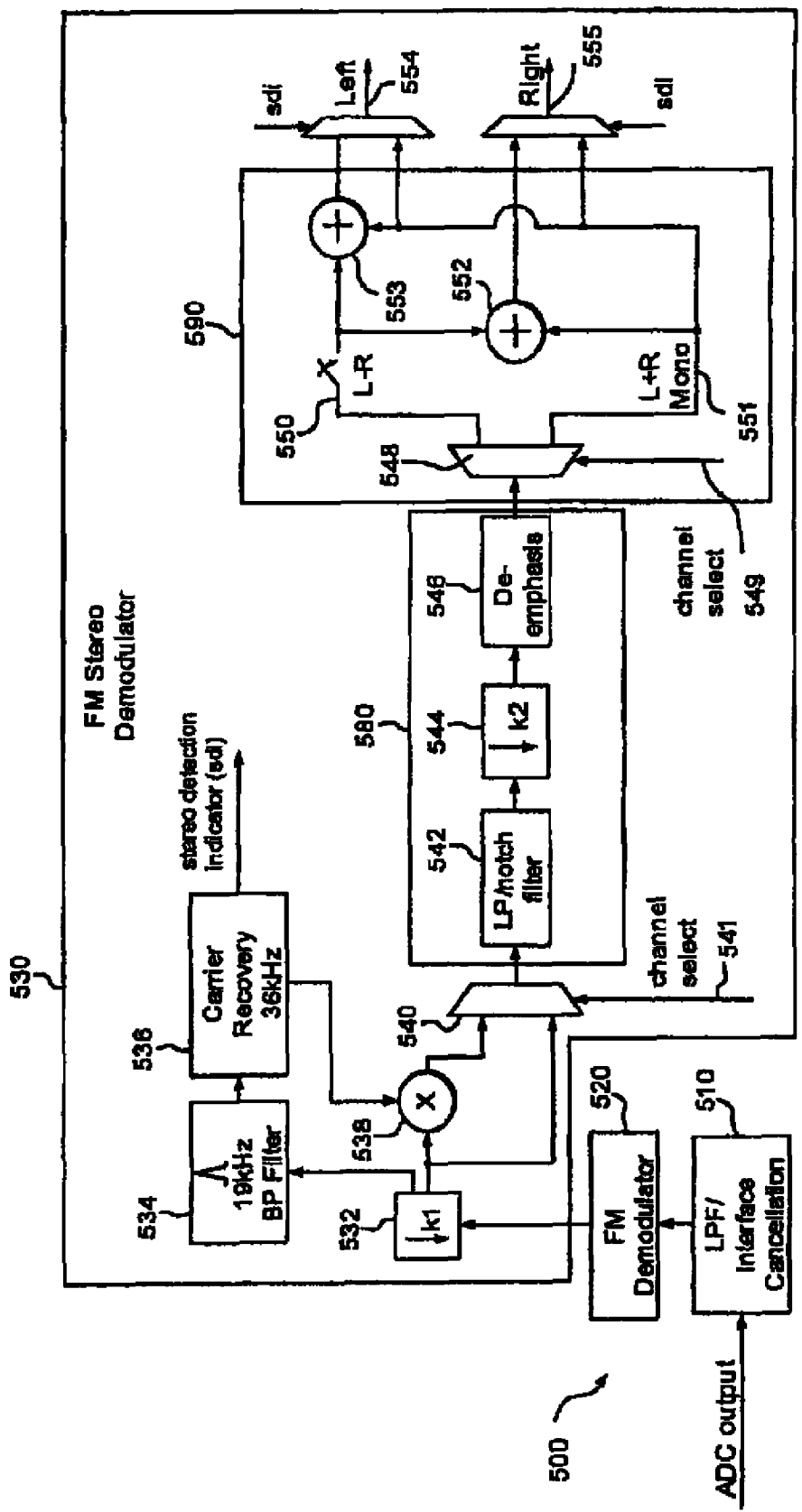
FIG. 5 shows an implementation of an FM stereo receiver system.

Digital FM stereo signal processing may be performed using different receiver architecture implementations. FIG. 5 shows an implementation of an FM stereo receiver system 500. System 500 may receive the output of one or more ADCs such as converter 235 of FIG. 2. A filter 510 may be provided in system 500 for additional channel selection and filtering, to reduce adjacent channel interference.

The output of filter 510 may be provided to a demodulator 520. Demodulator 520 may perform conventional digital FM demodulation. For example, demodulator 520 may obtain the demodulated multiplexed baseband signal by computing the differential of the angle of the complex received signal from the ADC.

The output of demodulator 520 may be provided to an FM stereo demodulator system 530 for recovery of a mono signal (for mono transmission) or left and right signals (for stereo transmission). In some cases, it may be advantageous to down-sample the signal received from the ADC. For example, depending on the particular FM demodulation algorithm and sampling rate used, the signal may be down-sampled by a factor denoted k1 using a down-sampler 532, to reduce the complexity required for subsequent FM stereo demodulation.

In some implementations of system 530, the system may determine if the demodulated signal includes a pilot tone. For example, the demodulated signal may be provided to a bandpass filter 534, and the output of bandpass filter 534 at 19 kHz may be subsequently detected. If the detected magnitude is greater than a threshold magnitude, the system determines that the signal includes a pilot tone and thus detects FM stereo transmission. If the magnitude is less than the threshold magnitude, the system detects mono transmission. A stereo detection indicator (SDI) may be set accordingly, to indicate stereo or mono transmission.

For stereo transmission, a carrier recovery module 536 may recover the 38 kHz carrier so that the L−R bitstream can be down-converted to baseband and subsequently detected. The output from carrier recovery module 536 and from down-sampler 532 (or alternately, FM demodulator 520) may be multiplied using a multiplier 538.

The current inventor realized that a stereo receiver architecture with reduced complexity may be provided by using a common processing module for a mono signal and for both L+R and L−R signals. Alternatively, to increase processing speed, more than one processing module may be provided so that at least some of the signals may be processed in parallel.

For example, system 500 may include a processor 580 for processing mono, L−R, and L−R signals. A multiplexer 540 may receive the input from multiplier 538 and from down-sampler 532. A channel select input 541 determines whether the L−R bitstream or the L+R bitstream (or mono bitstream, for mono transmission) is processed in processor 580.

For detecting both the mono and L+R transmissions, the FM demodulated bitstream is first passed through a filter 542 which may implement both low pass filtering and notch filtering, where a notch at 19 kHz allows the mono or L+R signal to be extracted while rejecting interference from the pilot tone.

The filtered bitstream may be sub-sampled by a factor of k2 using a sub-sampler 544. The bitstream may then be transmitted to a de-emphasis module 546. De-emphasis module 546 may include a filter denoted by G(z), where G(z) can be derived as shown in Equation (3):

$$G(z) = \frac{1-c}{1-cz^{-1}} \qquad \text{Equation (3)}$$

where $c=e^{1/\tau f}$, and where $\tau$ is typically equal to 50 μsec for Europe or 75 μsec for the United States.

The output of de-emphasis module 546 is input to a multiplexer 548. For mono transmission, a channel select input 549 (which may be based on the stereo detection indicator) sends the input signal of multiplexer 548 to both L output 554 and R output 555 via output 551 of multiplexer 548. For stereo transmission, multiplexer 548 sends the input signal to output 551 to be combined with an L−R signal as described below.

For detection of the L−R signal, the output of multiplexer 540 is the input from multiplier 538. The output of multiplexer 540 may be processed by processor 580 in the same manner as described above for processing the L+R or mono signals. The L−R signal is transmitted by multiplexer 548 on output 550 to be combined with an L+R signal.

The L+R and L−R signals are combined as follows. To obtain the R bitstream, the L−R signal is inverted and added to the L+R signal in a summer 552. To obtain the L bitstream, the L−R and L+R signals are added using a summer 553. The L and R bitstreams may then be output via left output 554 and right output 555, converted to analog signals and used to drive separate speakers (not shown).

Figure 6:
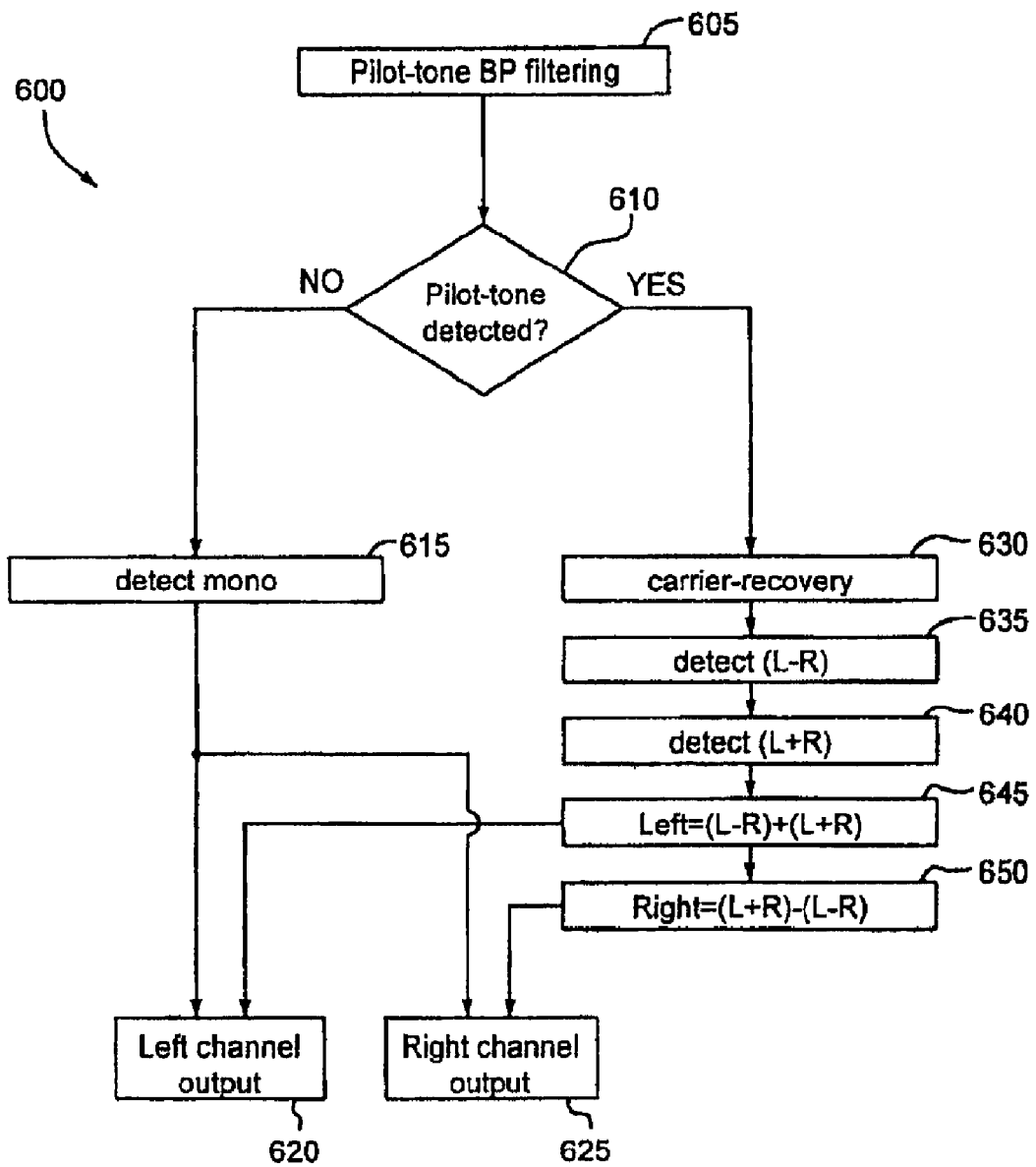
FIG. 6 shows an implementation of a control sequence that may be used with a receiver system such as that shown in FIG. 5.

FIG. 6 is a flow chart illustrating an implementation of a control sequence that may be used with a receiver system such as system 500 of FIG. 5. An input signal may be filtered (605), for example, using a 19 kHz bandpass filter. The output of the filter may be used to detect a pilot tone (610). If a pilot tone is not detected, mono transmission is detected (615). The mono signal is transmitted to both a left channel output (620) and a right channel output (625).

If a pilot tone is detected, carrier recovery may be performed (630). The recovered carrier may be used to detect the L−R bitstream (635). The L+R bitstream may be detected (640). The L+R and L−R bitstreams may be combined to generate a L bitstream (645) that is transmitted to the left channel output (620), as well as to generate a R bitstream (650) that is transmitted to the right channel output (625).

A number of implementations have been described. Nevertheless, it will be understood that various modifications may be made without departing from the spirit and scope of the invention. For example, some functionality described above and illustrated in the figures may be implemented using hardware, using software, or using a combination of hardware and software. Additionally, actions described in a certain order may in some cases be performed in a different order. For example, analog to digital conversion and/or digital to analog conversion may be performed at a different place in the signal processing than described. Accordingly, other implementations are within the scope of the following claims.

What is claimed is:

1. A receiver system, comprising:
 a received signal input configured to receive a digital signal based on a received mono signal or a received stereo signal;
 a stereo detector coupled with the received signal input, the stereo detector configured to produce a stereo detection signal indicating either a received stereo signal or a received mono signal; and
 a digital signal processor coupled with the stereo detector, the digital signal processor configured to process the digital signal based on stereo transmission when the stereo detection signal indicates a received stereo signal and process the digital signal based on mono transmission when the stereo detection signal indicates a received mono signal.

2. The system of claim 1, wherein the digital signal processor is further configured to sub-sample the digital signal.

3. The system of claim 1, wherein the digital signal processor is further configured to de-emphasize the digital signal.

4. The system of claim 1, further comprising a left/right processor coupled with an output of the digital signal processor, the left-right processor configured to generate a separate left bitstream and right bitstream based on an output signal from the digital signal processor.

5. A receiver system, comprising:
 a received signal input means configured to receive a digital signal based on a received mono signal or a received stereo signal;
 stereo detection means coupled with the received signal input means, the stereo detection means for producing a stereo detection signal indicating either a received stereo signal or a received mono signal; and
 a digital signal processing means coupled with the stereo detection means, the digital signal processing means for processing the digital signal based on stereo transmission when the stereo detection signal indicates a received stereo signal and processing the digital signal based on mono transmission when the stereo detection signal indicates a received mono signal.

6. The system of claim 5, wherein the digital signal processing means is further for sub-sampling the digital signal.

7. The system of claim 5, wherein the digital signal processing means is further for de-emphasizing the digital signal.

8. The system of claim 5, further comprising a left/right processing means coupled with an output of the digital signal processing means, the left/right processing means for generating a separate left bitstream and right bitstream based on an output signal from the digital signal processing means.

9. A receiver system, comprising:
 a received signal input configured to receive a digital signal based on a received mono signal or a received stereo signal;
 a carrier recovery module in communication with the received signal input, the carrier recovery module configured to recover a carrier signal based on the digital signal and including a bandpass filter which obtains a pilot signal used to recover the carrier signal; and
 a digital signal processor in communication with the carrier recovery module, the digital signal processor configured to filter the digital signal and facilitate mono and stereo signal processing, the filtered digital signal being mono or stereo processed based on a magnitude of an output of the bandpass filter;
 wherein:
 the pilot signal is detected when the magnitude of the output is greater than a predetermined threshold; and
 the digital signal processor processes the digital signal based on stereo transmission.

10. The system of claim 9, wherein the digital signal processor processes the digital signal based on mono transmission when the magnitude of the output is less than a predetermined threshold.

11. The system of claim 9, wherein the carrier recovery module includes an internal recovery module directly coupled with the bandpass filter to recover, based on the pilot signal, the carrier signal at an output of the internal recovery module when the magnitude of the output is greater than a predetermined threshold.

12. A receiver system, comprising:
 a received signal input means configured to receive a digital signal based on a received mono signal or a received stereo signal;
 a carrier recovery means in communication with the received signal input means, the carrier recovery means for recovering a carrier signal based on the digital signal and including a bandpass filter means to obtain a pilot signal through which the carrier signal is recovered; and
 a digital signal processing means in communication with the carrier recovery means, the digital signal processing means for filtering the digital signal and facilitating mono and stereo signal processing, the filtered digital signal being mono or stereo processed based on a magnitude of an output of the bandpass filter;
 wherein:
 the pilot signal is detected when the magnitude of the output is greater than a predetermined threshold; and
 the digital signal processing means processes the digital signal based on stereo transmission.

13. The system of claim 12, wherein the digital signal processing means processes the digital signal based on mono transmission when the magnitude of the output is less than a predetermined threshold.

14. The system of claim 12, wherein the carrier recovery means includes an internal recovery means directly coupled with the bandpass filter means to recover, based on the pilot signal, the carrier signal at an output of the internal recovery means when the magnitude of the output is greater than a predetermined threshold.

* * * * *